US009195097B2

(12) United States Patent
Mizusaki et al.

(10) Patent No.: US 9,195,097 B2
(45) Date of Patent: *Nov. 24, 2015

(54) LIQUID CRYSTAL DISPLAY DEVICE AND PROCESS FOR PRODUCING LIQUID-CRYSTAL DISPLAY DEVICE

(75) Inventors: Masanobu Mizusaki, Osaka (JP); Youhei Nakanishi, Osaka (JP); Takeshi Noma, Osaka (JP); Yuichiro Yamada, Osaka (JP); Satoshi Enomoto, Tokyo (JP); Yuki Hara, Tokyo (JP); Hideo Kikuchi, Tokyo (JP)

(73) Assignees: SHARP KABUSHIKI KAISHA, Osaka (JP); TOYO GOSEI CO., LTD., Chiba (JP)

( * ) Notice: Subject to any disclaimer, the term of this patent is extended or adjusted under 35 U.S.C. 154(b) by 151 days.

This patent is subject to a terminal disclaimer.

(21) Appl. No.: 13/814,055

(22) PCT Filed: Jul. 27, 2011

(86) PCT No.: PCT/JP2011/067051
§ 371 (c)(1),
(2), (4) Date: Feb. 4, 2013

(87) PCT Pub. No.: WO2012/017884
PCT Pub. Date: Feb. 9, 2012

(65) Prior Publication Data
US 2013/0128202 A1 May 23, 2013

(30) Foreign Application Priority Data

Aug. 3, 2010 (JP) ................................. 2010-174501

(51) Int. Cl.
*G02F 1/1337* (2006.01)
*C08F 20/20* (2006.01)

(52) U.S. Cl.
CPC .... *G02F 1/133711* (2013.01); *G02F 1/133723* (2013.01); *B32B 2457/202* (2013.01);
(Continued)

(58) Field of Classification Search
CPC ............... C08F 20/20; G02F 1/133711; G02F 1/133723; G02F 1/133788; G02F 2001/133742; G02F 2202/023; Y10T 428/1018; Y10T 428/1023; B32B 2457/202
USPC .......................... 428/1.2–1.28; 349/123–136
See application file for complete search history.

(56) References Cited

U.S. PATENT DOCUMENTS 7,169,449 B2    1/2007  Nakanishi et al.
8,551,358 B2 * 10/2013  Lee et al. .................. 252/299.6
(Continued)

FOREIGN PATENT DOCUMENTS

CN         1664657        9/2005
CN       101108968        1/2008
(Continued)

OTHER PUBLICATIONS

Restriction Requirement mailed Sep. 18, 2014 in U.S. Appl. No. 13/813,772.
(Continued)

*Primary Examiner* — Sophie Hon
(74) *Attorney, Agent, or Firm* — Nixon & Vanderhye P.C.

(57) ABSTRACT

The liquid crystal display device according to the present invention includes a pair of substrates, and a liquid crystal layer disposed between the pair of substrates, wherein the liquid crystal layer includes a liquid crystal material having a negative dielectric constant anisotropy, at least one of the pair of substrates is provided with an alignment film for vertically aligning adjacent liquid crystal molecules, and a polymer layer formed on the alignment film for controlling the alignment of the adjacent liquid crystal molecules, the polymer layer is formed by polymerization of at least one monomer, the polymerization being initiated by radicals generated of the monomer upon absorption of light, the alignment film includes a polymer compound having a main chain that contains an imide structure, and the main chain has an imidization ratio of less than 50%.

7 Claims, 3 Drawing Sheets

(52) U.S. Cl.
CPC .......... *C08F20/20* (2013.01); *G02F 1/133788* (2013.01); *G02F 2001/133742* (2013.01); *G02F 2202/023* (2013.01); *Y10T 428/1018* (2015.01); *Y10T 428/1023* (2015.01)

(56) References Cited

U.S. PATENT DOCUMENTS

| | | |
|---|---|---|
| 2003/0067579 A1 | 4/2003 | Inoue et al. |
| 2003/0086044 A1 | 5/2003 | Inoue et al. |
| 2003/0095229 A1 | 5/2003 | Inoue et al. |
| 2004/0169790 A1 | 9/2004 | Inoue et al. |
| 2004/0174471 A1 | 9/2004 | Nakanishi et al. |
| 2004/0246406 A1 | 12/2004 | Inoue et al. |
| 2004/0263719 A1 | 12/2004 | Inoue et al. |
| 2005/0018105 A1 | 1/2005 | Inoue et al. |
| 2005/0024556 A1 | 2/2005 | Nakahata et al. |
| 2005/0030445 A1 | 2/2005 | Inoue et al. |
| 2005/0116200 A1 | 6/2005 | Nakanishi et al. |
| 2005/0253988 A1 | 11/2005 | Inoue et al. |
| 2005/0264737 A1 | 12/2005 | Kataoka et al. |
| 2007/0182887 A1 | 8/2007 | Haga et al. |
| 2008/0090026 A1 | 4/2008 | Bernatz et al. |
| 2008/0179565 A1 | 7/2008 | Hsieh et al. |
| 2008/0293888 A1 | 11/2008 | Bachels et al. |
| 2008/0316406 A1 | 12/2008 | Inoue et al. |
| 2009/0002858 A1 | 1/2009 | Okutsu et al. |
| 2009/0141215 A1 | 6/2009 | Bremer et al. |
| 2010/0253605 A1 | 10/2010 | Inada |
| 2011/0051049 A1 | 3/2011 | Goetz et al. |
| 2011/0058134 A1 | 3/2011 | Inoue et al. |
| 2011/0164213 A1 | 7/2011 | Nakanishi et al. |
| 2011/0199566 A1 | 8/2011 | Mazusaki et al. |
| 2011/0267574 A1* | 11/2011 | Kawahira et al. ............ 349/158 |
| 2012/0033167 A1 | 2/2012 | Mizusaki et al. |
| 2012/0076952 A1 | 3/2012 | Bachels et al. |
| 2013/0004679 A1 | 1/2013 | Bachels |
| 2013/0128202 A1 | 5/2013 | Mizusaki et al. |
| 2013/0128203 A1 | 5/2013 | Mizusaki et al. |
| 2013/0128204 A1 | 5/2013 | Mizusaki et al. |
| 2013/0135570 A1 | 5/2013 | Mizusaki et al. |
| 2013/0169906 A1 | 7/2013 | Nakanishi et al. |
| 2013/0169916 A1 | 7/2013 | Mizusaki |
| 2013/0271712 A1 | 10/2013 | Mizusaki et al. |
| 2013/0286340 A1 | 10/2013 | Mizusaki et al. |

FOREIGN PATENT DOCUMENTS

| | | |
|---|---|---|
| CN | 101008784 | 1/2011 |
| JP | 63-233952 | 9/1988 |
| JP | 6-18898 | 1/1994 |
| JP | 9-227454 | 9/1997 |
| JP | 9-255706 | 9/1997 |
| JP | 10-338880 | 12/1998 |
| JP | 2002-323701 | 11/2002 |
| JP | 2003-177418 | 6/2003 |
| JP | 2003-307720 A | 10/2003 |
| JP | 2005-31288 | 2/2005 |
| JP | 2005-221617 | 8/2005 |
| JP | 2005-338613 | 12/2005 |
| JP | 2006-058775 | 3/2006 |
| JP | 2006-317896 | 11/2006 |
| JP | 2008-116931 | 5/2008 |
| JP | 2008-134666 | 6/2008 |
| JP | 4175826 | 8/2008 |
| JP | 2009-520702 | 5/2009 |
| JP | 2009-132718 A | 6/2009 |
| JP | 2010-107537 | 5/2010 |
| WO | WO 2008/078629 | 7/2008 |
| WO | WO 2009/118086 | 10/2009 |
| WO | WO 2010/026721 | 3/2010 |
| WO | WO 2010/041665 | 4/2010 |
| WO | WO 2010/047011 | 4/2010 |
| WO | 2010-079703 A1 | 7/2010 |
| WO | 2010/079703 A1 | 7/2010 |
| WO | WO 2010/079703 | 7/2010 |
| WO | WO 2010079703 A1 * | 7/2010 | ............ G02F 1/1337 |
| WO | WO 2010/116564 | 10/2010 |

OTHER PUBLICATIONS

Restriction Requirement mailed Sep. 5, 2014 in U.S. Appl. No. 13/813,828.
International Search Report for PCT/JP2011/067051, mailed Sep. 6, 2011.
Mery et al., "Liquid crystals containing a 2,6-disubstituted anthracene core-mesomorphism, charge transport and photochemical properties", *Journal of Materials Chemistry*, vol. 13, (2003), pp. 1622-1630.
Office Action mailed Oct. 24, 2014 in U.S. Appl. No. 13/814,025.
International Search Report mailed Oct. 4, 2011 in PCT/JP2011/070009.
International Search Report for PCT/JP2011/079706, mailed Apr. 3, 2012.
International Search Report for PCT/JP2011/078159 mailed Jan. 24, 2012.
International Search Report for PCT/JP2011/067049 mailed Sep. 6, 2011.
International Search Report for PCT/JP2011/067047 mailed Sep. 6, 2011.
International Search Report for PCT/JP2011/067052 mailed Sep. 6, 2011.
U.S. Office Action mailed Dec. 15, 2014 in U.S. Appl. No. 13/813,828.
U.S. Office Action mailed Dec. 10, 2014 in U.S. Appl. No. 13/813,772.
U.S. Office Action mailed Dec. 22, 2014 in U.S. Appl. No. 13/821,412.
Restriction Requirement mailed Oct. 8, 2014 in U.S. Appl. No. 13/814,055.
U.S. Office Action mailed Dec. 4, 2014 in U.S. Appl. No. 13/814,055.
K. Maruyama et al., "The Photochemical Reaction of a-Diketones", Bulletin of the Chemical Society of Japan, Mar. 1972, vol. 45 pp. 847-851.
U.S. Office Action mailed Mar. 30, 2015 in U.S. Appl. No. 13/813,772 (Mizusaki).

* cited by examiner

LIQUID CRYSTAL DISPLAY DEVICE AND PROCESS FOR PRODUCING LIQUID-CRYSTAL DISPLAY DEVICE

This application is the U.S. national phase of International Application No. PCT/JP2011/067051, filed 27 Jul. 2011, which designated the U.S. and claims priority to JP Application No. 2010-174501, filed 3 Aug. 2010, the entire contents of each of which are hereby incorporated by reference.

TECHNICAL FIELD

The present invention relates to a liquid crystal display device, and a method for producing a liquid crystal display device. More specifically, the present invention relates to a liquid crystal display device in which a polymer layer is formed on an alignment film to maintain liquid crystal-alignment control for a long time, and a method for producing a liquid crystal display device that suitably allows formation of a polymer layer on an alignment film.

BACKGROUND ART

Liquid crystal display devices are thin, light, and consume little power, and are therefore widely used as display equipment for televisions, personal computers, PDAs, and the like. These days, in particular, larger liquid crystal display devices have been rapidly introduced, as typically exemplified by liquid crystal display devices for TVs. For enlarging of the size, multi-domain vertical alignment (MVA) mode liquid crystal display devices, which can be produced at a high yield even if they have large areas, and also which have a wide viewing angle, are favorably developed. In the case of multi-domain vertical alignment mode, liquid crystal molecules are aligned perpendicularly to a substrate surface when no voltage is applied in a liquid crystal layer. Therefore, a higher contrast ratio can be achieved as compared to conventional twisted nematic (TN) mode.

However, since ribs (protrusions) are formed in MVA mode, problematically the aperture ratio decreases, resulting in reduction in the white luminance. This problem is solved when the distances among ribs are sufficiently large, while the number of the ribs which are alignment-controlling structures is reduced. As a result, a longer time is required for stability of the alignment of liquid crystals after application of a predetermined voltage, problematically increasing the response time. In order to solve the above problems and to enable high luminance and high-speed response, a technology for providing pretilt angles by use of polymers (hereinafter, also referred to as PSA (polymer sustained alignment) layers) is proposed (see, for example, Patent Literatures 1 to 4). In PSA technology, a liquid crystal composition including liquid crystals and polymerizable components such as monomers and oligomers (hereinafter, abbreviated as monomers, etc.) is enclosed between substrates. Then, a voltage is applied between the substrates so that the monomers, etc. are polymerized, with the liquid crystal molecules tilting, to form a polymer. As a result, after removal of the applied voltage, the liquid crystals have a predetermined pretilt angle. Thus, the alignment direction of the liquid crystals can be set. Polymerization of the monomers, etc. is initiated by heat or light (ultraviolet rays) irradiation. The PSA technology needs no ribs, and thus the aperture ratio is improved. At the same time, a pretilt angle of less than 90 degree is provided on the entire display area, thereby enabling high-speed response.

CITATION LIST

Patent Literature

Patent Literature 1: WO 2009/118086
Patent Literature 2: Chinese Patent No. 101008784
Patent Literature 3: US Patent Application Publication No. 2008/179565
Patent Literature 4: U.S. Pat. No. 7,169,449
Patent Literature 5: JP 63-233952 B Non-Patent Literature Non-Patent Literature 1: J. Mater. Chem, 2003, vol. 13, pages 1622-1630

SUMMARY OF INVENTION

Technical Problem

As a result of investigations, the present inventors found that, even if a polymer layer for maintaining liquid crystal-alignment control is formed on an alignment film by injecting a liquid crystal layer composition including a liquid crystal material, polymerizable monomers, and a polymerization initiator between a pair of substrates and then initiating polymerization under a predetermined condition, continuous display of the same pattern image sometimes causes "image sticking" in the conventional PSA technology. One of the causes of "image sticking" is presence of electrically-charged materials (ions, radical precursors, or the like). Such materials generate a direct current offset voltage inside the cell, and thus an alignment status of the liquid crystals changes upon application of a voltage from outside.

The inventors of the present invention made more detailed studies concerning the causes of image sticking in a liquid crystal display device, and they focused their attention on components included in a liquid crystal layer after polymerization. The inventors found out that unreacted monomers, a polymerization initiator, or the like remain in the liquid crystal layer even after completion of a series of polymerization. The inventors further found out that, if easily electrically chargeable materials such as unreacted monomers and a polymerization initiator remain in the liquid crystal layer, the electric charge generally tends to be transferred to other materials due to influence of backlight in general use after completion of production, or influence of an aging step for test after assembling. As a result, ionic impurities tend to be generated, thereby causing image sticking in the liquid crystal display.

Moreover, the inventors of the present invention made various studies on use of polyimides as materials for alignment films, and they focused on the imidization ratio of polyimides. As a result of more detailed investigation, they have found that, if a material having an imidization ratio of not less than 50% is used, the wettability to substrates is problematically low.

The present invention has been made in consideration of the above current situation, and aims to provide a liquid crystal display device in which a high wettability to substrates can be achieved, and also image sticking seldom occurs.

Solution to Problem

The inventors have made various studies concerning a method that can prevent "image sticking." As a result, they focused on a combination of a PSA layer for maintaining alignment control to be formed on an alignment film and the alignment film serving as a base for the PSA layer. The inventors found that combination use of a polyimide having an imidization ratio of less than 50% as a main component of an alignment film and a polymerizable monomer which by itself generates radicals upon absorption of light to initiate polymerization as a polymerizable monomer for PSA layer formation advantageously enables not only to initiate a polymerization reaction without using a polymerization initiator but also to enhance the wettability to a substrate so that an alignment film having a uniform thickness can be more easily formed on the substrate. Accordingly, the inventors have successfully solved the above problems, and thereby the present invention was completed.

That is, one aspect of the present invention is a liquid crystal display device including a pair of substrates, and a liquid crystal layer disposed between the pair of substrates, wherein the liquid crystal layer includes a liquid crystal material having a negative dielectric constant anisotropy, at least one of the pair of substrates is provided with an alignment film for vertically aligning adjacent liquid crystal molecules, and a polymer layer formed on the alignment film for controlling the alignment of the adjacent liquid crystal molecules, the polymer layer is formed by polymerization of at least one monomer, the polymerization being initiated by radicals generated of the monomer upon absorption of light, the alignment film includes a polymer compound having a main chain that contains an imide structure, and the main chain has an imidization ratio of less than 50%.

In the liquid crystal display device of the present invention, one of the pair of substrates is used as, for example, an array substrate, and the other substrate is used as a color filter substrate. The array substrate is provided with a plurality of pixel electrodes, and the alignment of the liquid crystals is controlled in each pixel. In the color filter substrate, a plurality of colors of color filters are disposed at positions overlapping the respective pixel electrodes in the array substrate, and colors to be displayed are controlled in each pixel.

In the liquid crystal display device of the present invention, at least one of the pair of substrates is provided with an alignment film for vertically aligning adjacent liquid crystal molecules. The alignment film in the present invention is a vertical alignment film for vertically aligning adjacent liquid crystal molecules. The alignment film that has or has not undergone an alignment treatment may be used.

The liquid crystal layer in the liquid crystal display device of the present invention is filled with liquid crystal materials having a negative dielectric constant anisotropy. Thus, the liquid crystal molecules remain vertically aligned to the substrate surface when no voltage is applied inside the liquid crystal layer. The liquid crystal molecules tilt horizontal to the substrate surface when a threshold or higher voltage is applied. As mentioned earlier, a liquid crystal mode of the liquid crystal display device of the present invention is one embodiment of a VA mode.

In the liquid crystal display device of the present invention, at least one of the pair of substrates is provided with a polymer layer that is formed on the alignment film for controlling the alignment of the adjacent liquid crystal molecules. The polymer layer is formed by polymerization of at least one monomer, the polymerization being initiated by radicals generated of the monomer upon absorption of light. Since the polymer layer is formed by a polymerization reaction without using a polymerization initiator in the present invention, the display properties are not changed by influences of unreacted polymerization initiator residues. Therefore, occurrence of image sticking on display can be reduced.

Due to the polymer layer formed, even if the alignment film has not undergone an alignment treatment, the liquid crystal molecules adjacent to the alignment film and the polymer layer can be initially tilted in a certain direction. For example, in the case that the monomers are polymerized, with the liquid crystal molecules aligned at the pretilt angle, to form a polymer layer, the formed polymer layer has a structure to allow the liquid crystal molecules to align in the pretilt angle, regardless of whether the alignment film has undergone an alignment treatment.

The alignment film includes a polymer compound having a main chain that contains an imide structure. The main chain has an imidization ratio of less than 50%. That is, the alignment film in the liquid crystal display device of the present invention includes a polyimide whose imidization ratio is controlled. The term "imidization ratio" herein refers to a ratio (mol %) of an amide group or a carboxyl group that is dehydrated or cyclized by imidization in a polyamic acid which is a precursor of a polyimide compound. Use of a polyimide that is controlled to have an imidization ratio of less than 50% enables to enhance the wettability to a substrate so that an alignment film having a uniform thickness can be more easily formed on the substrate.

The configuration of the liquid crystal display device of the present invention is not especially limited by other components as long as it essentially includes such components.

Another aspect of the present invention is a method for producing a liquid crystal display device including a pair of substrates, and a liquid crystal layer disposed between the pair of substrates, the method including forming an alignment film for vertically aligning adjacent liquid-crystal molecules on at least one of the pair of substrates, and forming a polymer layer for controlling the alignment of the adjacent liquid crystal molecules on the alignment film, wherein the polymer layer formation includes initiating polymerization of at least one monomer that generates radicals upon absorption of light by exposing the monomer to light, the alignment film includes a polymer compound having a main chain that contains an imide structure, and the main chain has an imidization ratio of less than 50%.

The features of liquid crystal display devices to be produced by the production method according to the present invention are the same as those of the liquid crystal display device of the present invention.

In the case that a monomer that generates radicals upon absorption of light to be polymerized is used as a material for forming a polymer layer that is formed on an alignment film and functions for controlling the alignment of the adjacent liquid crystal molecules, the polymerization reaction is initiated without a polymerization initiator. Thus, the display properties are not changed by influences of unreacted polymerization initiator residues. Therefore, occurrence of image sticking on display can be reduced.

Moreover, formation of a polyimide having an imidization ratio of less than 50% enables to enhance the wettability to a substrate so that an alignment film having a uniform thickness can be more easily formed on the substrate.

The production method of the liquid crystal display device according to the present invention is not especially limited as long as these steps are included. The production method may include other steps. The polymer layer formation may include initiating polymerization by light irradiation to the liquid crystal layer to which a threshold or higher voltage is applied or initiating polymerization by light irradiation to the liquid crystal layer to which a threshold or higher voltage is not applied.

Preferable embodiments of the liquid crystal display device and the method for producing the liquid crystal display device of the present invention are mentioned in more detail below.

In the case of using a polyimide having an imidization ratio of less than 50%, advantageously the wettability to a substrate is enhanced so that an alignment film having a uniform thickness can be more easily formed on the substrate. Meanwhile, if a polyimide having an imidization ratio of less than 50% is used, the voltage holding ratio (VHR) after long time use of the liquid crystal display device is reduced, thereby deteriorating the reliability in some cases. This problem may be solved as follows.

At least one of the monomers that form the polymer layer preferably generates radicals upon exposure to light that has a wavelength of not less than 330 nm, preferably not less than 340 nm, and also still more preferably not more than 430 nm. FIG. 5 is a graph showing a relationship between the absorbance (a.u.) of a reference monomer and the transmittance (%) of an alignment film-formed substrate. FIG. 6 is a graph showing a relationship between the absorbance (a.u.) of one example of the monomer of the present invention and the transmittance (%) of an alignment film-formed substrate. As shown in FIG. 5, many of common monomers (reference monomers) generate radicals upon exposure to light having a wavelength of not more than 320 nm. Generally, however, a substrate having an alignment film on the surface thereof to be used in liquid crystal display devices tends not to allow penetration of light having a wavelength of less than 330 nm due to a main chain and a side chain of a polymer included in the alignment film. For this reason, a reference monomer needs to be exposed to ultraviolet rays having a wavelength of 310 nm for a long time or a plurality of times for sufficient photopolymerization. However, exposure to such ultraviolet rays for a long time or a plurality of times degrades parts (for example, alignment film and liquid crystal layer) of the liquid crystal display device, causing defects such as image sticking in some cases. On the other hand, in the case that exposure to ultraviolet rays is performed only for a short time so as to prevent degradation of an alignment film and a liquid crystal layer, the monomer is not sufficiently polymerized so that a defective PSA layer is formed, causing defects such as image sticking in some cases. Moreover, many of common ultraviolet ray light sources emit light that has a wavelength of 310 nm with low intensity and emit light that has a wavelength of not less than 330 nm with high intensity. In contrast, as shown in FIG. 6, the embodiment of the present invention uses a monomer that absorbs light having a wavelength of not less than 330 nm. Therefore, the light-use efficiency is enhanced, enabling formation of a stable PSA layer even by single short-term exposure to light. Specifically, even if an alignment film that includes a polyimide having an imidization ratio of less than 50% is used, a high voltage holding ratio (VHR) can be maintained after long time use of the liquid crystal display device. Also, occurrence of image sticking on display can be reduced.

The at least one of the monomers is preferably a bifunctional monomer. Use of a bifunctional monomer enables to form a stable PSA layer for covering the surface of the alignment film even by exposure to light for a shorter time than the case using a monofunctional monomer. Moreover, a high voltage holding ratio (VHR) can be maintained after long time use of the liquid crystal display device.

The at least one of the bifunctional monomers is preferably a condensed aromatic compound represented by the following formula (I):

$$P^1\text{-}A^1\text{-}(Z^1\text{-}A^2)_n\text{-}P^2 \qquad (I)$$

wherein $P^1$ and $P^2$ are each independently an acryloyloxy group, a methacryloyloxy group, an acryloylamino group, or a methacryloylamino group; and $A^1$ and $A^2$ are each independently one selected from the group consisting of groups represented by the following formulae (1-1) to (1-15):

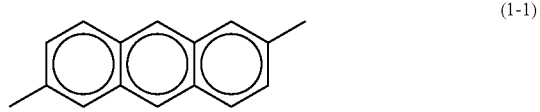
(1-1)

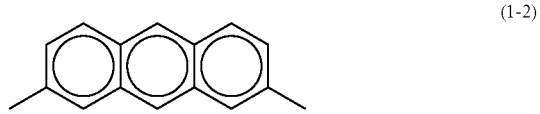
(1-2)

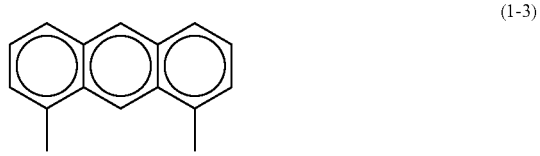
(1-3)

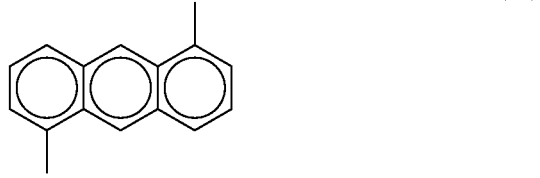
(1-4)

(1-5)

(1-6)

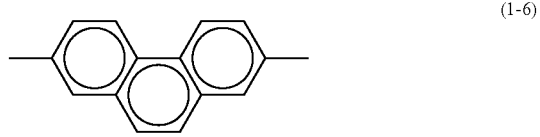
(1-7)

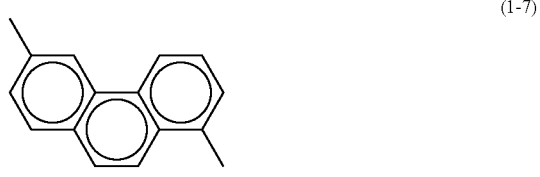
(1-8)

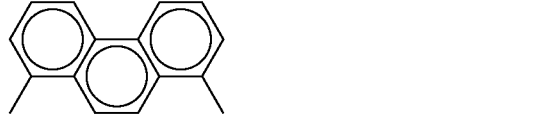
(1-9)

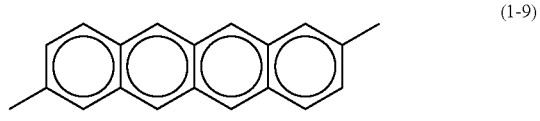
(1-10)

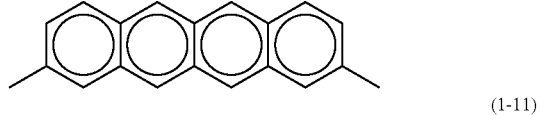
(1-11)

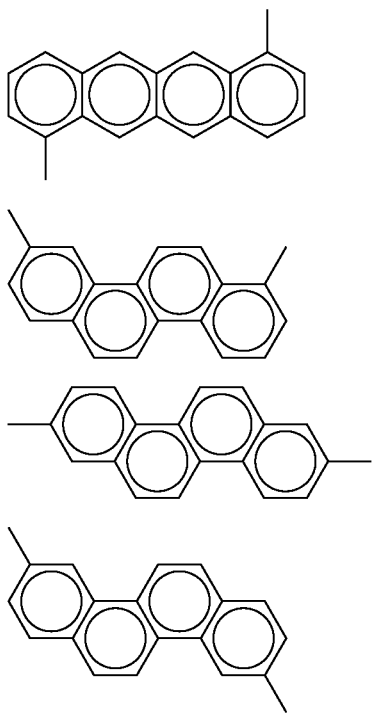

(1-12)

(1-13)

(1-14)

(1-15)

wherein a hydrogen atom in $A^1$ and $A^2$ may be substituted with a halogen group, a methyl group, an ethyl group or a propyl group; $Z^1$ may be singular or plural and each independently is —COO—, —OCO—, —O—, CO—, —NHCO—, —CONH—, or —S—, or a direct bond between $A^1$ and $A^2$ or between $A^2$ and $A^2$; and n is 0, 1, or 2. In the case that the monomer has a condensed ring including not less than three benzene rings such as anthracene and phenanthrene represented by the above chemical formulae (1-1) to (1-15), the monomer can absorb light having a wavelength longer than 330 nm. Therefore, a higher light-use efficiency is achieved as compared to the case of the reference monomer, and a stable PSA layer can be produced. Since phenanthrene monomers are highly soluble in liquid crystal materials as compared to anthracene monomers, they are greater in terms of light-use efficiency. In the case of using an anthracene monomer, a similar absorbance as that in the case of using a phenanthrene monomer is achieved only by mixing other monomers that is highly soluble in liquid crystal materials with a small amount of the anthracene monomer. Accordingly, the light-use efficiency is enhanced.

More preferably, the at least one of the bifunctional monomers is preferably a condensed aromatic compound represented by the following formula (II):

$$P^1\text{-}A^1\text{-}P^1 \quad (II)$$

wherein P1s are each independently an acryloyloxy group, a methacryloyloxy group, an acryloylamino group, or a methacryloylamino group; and $A^1$ is either one of groups represented by the following formulae (2-1) and (2-2):

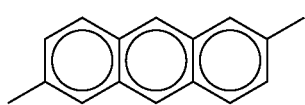

(2-1)

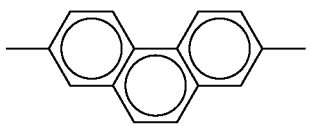

(2-2)

wherein a hydrogen atom in $A^1$ may be substituted with a halogen group, a methyl group, an ethyl group, or a propyl group. In the case where the monomer has a condensed ring including not less than three benzene rings such as anthracene and phenanthrene represented by the above chemical formulae (2-1) or (2-2), the monomer can absorb light having a wavelength longer than 330 nm. Therefore, a higher light-use efficiency is achieved as compared to the case of the reference monomer, and a stable PSA can be produced.

Preferably, a voltage holding ratio of the liquid crystal layer after a lapse of 16.61 ms from application of a pulse voltage of 1 V is not less than 99.0%, and also preferably a residual DC voltage of the liquid crystal layer after application of a DC offset voltage of 2 V for 10 hours is not more than 50 mV; after the liquid crystal layer has been allowed to stand on a backlight for 1000 hours. This setting enables to produce a highly reliable liquid crystal display device in which image sticking seldom occurs. The voltage holding ratio can be measured with, for example, a liquid crystal physical property evaluation system 6254 produced by TOYO Corporation.

Advantageous Effects of Invention

The liquid crystal display device according to the present invention can advantageously not only prevent occurrence of "image sticking" but also enhance the wettability to a substrate so that an alignment film having a uniform thickness can be more easily formed on the substrate.

DESCRIPTION OF EMBODIMENTS

Figure 1:
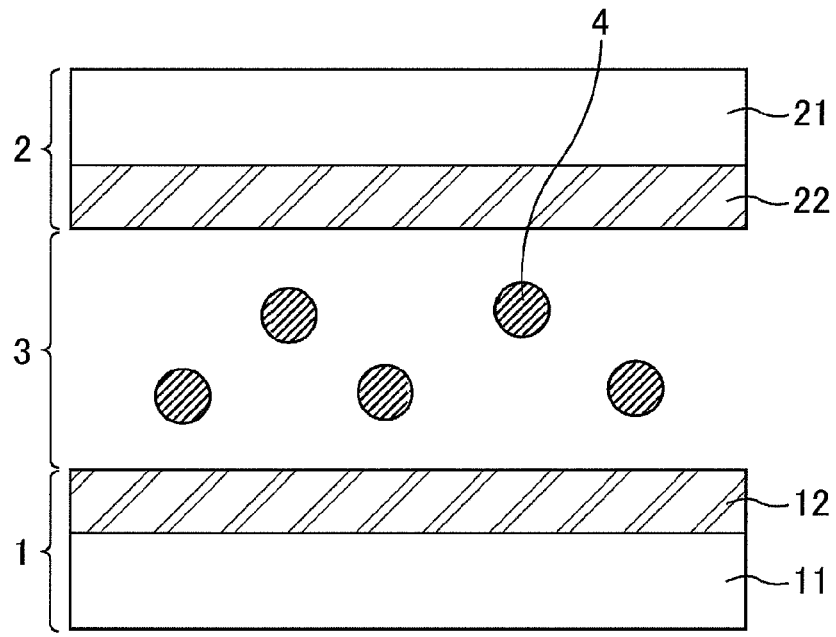
FIG. 1 is a cross-sectional view schematically illustrating a liquid crystal display device according to Embodiment 1 before the PSA polymerization step.

The present invention will be mentioned in more detail referring to the drawings in the following embodiments, but is not limited to these embodiments.

Embodiment 1

Figure 2:
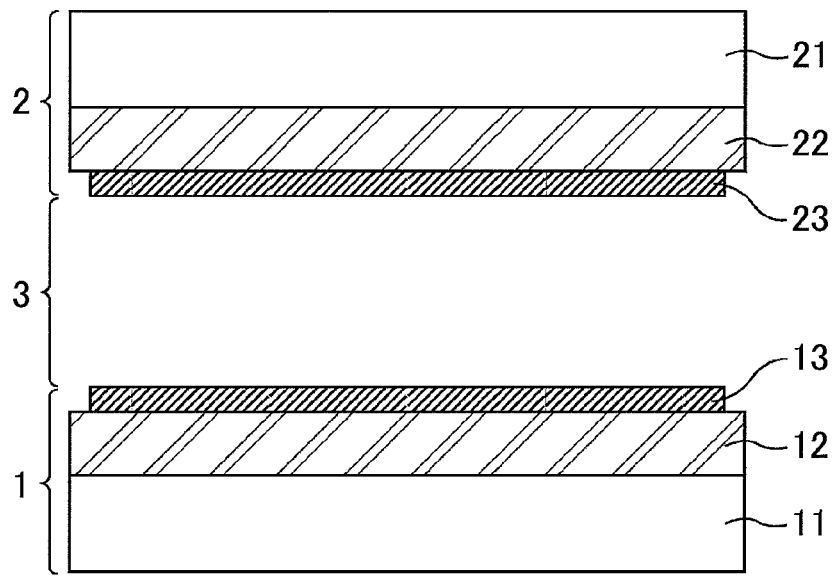
FIG. 2 is a cross-sectional view schematically illustrating a liquid crystal display device according to Embodiment 1 after the PSA polymerization step.

FIG. 1 and FIG. 2 each are a cross sectional view schematically illustrating a liquid crystal display device according to Embodiment 1. FIG. 1 illustrates the liquid crystal display device before the PSA polymerization step, and FIG. 2 illustrates the liquid crystal display device after the PSA polymerization step. As shown in FIG. 1 and FIG. 2, the liquid crystal display device according to Embodiment 1 includes an array substrate 1, a color filter substrate 2, and a liquid crystal layer 3 disposed between a pair of the substrates consisting of the array substrate 1 and the color filter substrate 2. The array substrate 1 includes an insulating transparent substrate made of glass, or the like, and a support substrate 11 that is formed on the transparent substrate and is provided with various wirings, pixel electrodes, a TFT (Thin Film Transistor), or the like. The color filter substrate 2 includes an insulating transparent substrate made of glass, or the like, and a support substrate 21 that is formed on the transparent substrate and is provided with a color filter, black matrix, common electrodes, or the like.

In the array substrate 1, an alignment film 12 is provided on the support substrate 11. In the color filter substrate 2, an alignment film 22 is provided on the support substrate 21. The alignment films 12 and 22 include a polymer compound (polyimide) having a main chain that contains an imide structure. For example, if vertical alignment films are used as the alignment films 12 and 22, liquid crystal molecules have a pretilt angle of approximately 90° even without having undergone an alignment treatment. Furthermore, an alignment treatment on the surface of the vertical alignment film allows the liquid crystal molecules to tilt (initially tilt) a certain angle from the tilt angle of approximately 90°. A compound having a longer side chain than common polymers is used as a material for the vertical alignment film.

As shown in FIG. 1, one, or two or more monomer(s) 4 are present in the liquid crystal layer 3 before the PSA polymerization step. Polymerization of the polymerizable monomer (s) 4 is initiated by the PSA polymerization step so that PSA and 23 are formed on the alignment films 12 and 22, respectively.

Specifically, the PSA and 23 may be formed by injecting a composition for forming a liquid crystal layer that contains the one, or two or more polymerizable monomer (s) 4 and liquid crystal materials having a negative dielectric constant anisotropy between the array substrate 1 and the color filter substrate 2 to form the liquid crystal layer, and then exposing the liquid crystal layer 3 to a certain amount of light so that the polymerizable monomer (s) 4 is/are polymerized. FIG. 2 illustrates an embodiment in which the PSA layers respectively cover the entire surfaces of the alignment films. Practically, the PSA layers each may be formed in a dotted pattern at a plurality of locations, and may have uneven thickness.

The polymerizable monomers 4 used in Embodiment 1 by themselves absorb light and generate radicals to initiate chain polymerization. Therefore, a polymerization initiator needs not to be added.

In Embodiment 1, the PSA polymerization step is initiated by light irradiation to the liquid crystal layer 3 to which a threshold or higher voltage is applied. As a result, a polymer is formed in accordance with the alignment of the liquid crystal molecules under a threshold or higher voltage application. Therefore, the formed PSA layers have structures capable of functioning as alignment films that allow the liquid crystal molecules to have an initial pretilt angle even under no voltage application later.

In Embodiment 1, the light irradiation may be performed on the liquid crystal layer 3 to which a threshold or higher voltage is not applied. For example, in the case where the alignment films 12 and 22 by themselves have a feature to allow the liquid crystal molecules to align at a pretilt angle, the PSA and 23 formed on the respective alignment films 12 and 22 function as layers to enhance the alignment-stabilizing property of the alignment film. As a result, the alignment-controlling ability is maintained for a long time so that temporary changes in the alignment are reduced. Moreover, occurrence of image sticking on display is reduced. In Embodiment 1, the PSA and 23 may be formed by firstly subjecting the alignment films 12 and 22 to an alignment treatment and then exposing the liquid crystal layer 3 to light under a threshold or higher voltage application. This setting enables to provide films having better alignment stability.

In Embodiment 1, the alignment of the liquid crystal molecules may be set by line-shaped slits that are provided in a pixel electrode included in the support substrate 11, or in a common electrode included in the support substrate 21. In the case where thin line-shaped slits are formed in the pixel electrode and/or common electrode, liquid crystal molecules have a property of uniformly aligning toward the line-shaped slits when a voltage is applied thereto. Therefore, PSA layers capable of allowing the liquid crystal molecules to have a pretilt angle can be formed even when the alignment film has not undergone an alignment treatment.

At least one polymerizable monomer used in Embodiment 1 is a monomer that generates radicals upon exposure to light having a wavelength of not less than 330 nm, and the monomer is a condensed aromatic compound represented by the following formula (I):

$$P^1\text{-}A^1\text{-}(Z^1\text{-}A^2)_n\text{-}P^2 \qquad (I)$$

wherein $P^1$ and $P^2$ are each independently an acryloyloxy group, a methacryloyloxy group, an acryloylamino group, or a methacryloylamino group; $A^1$ and $A^2$ are each independently one selected from the group consisting of groups represented by the following formulae (1-1) to (1-15):

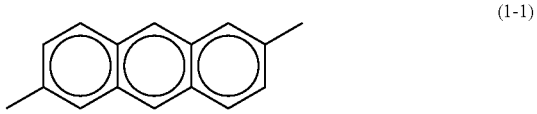

(1-1)

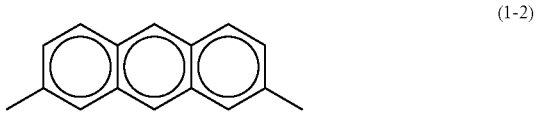

(1-2)

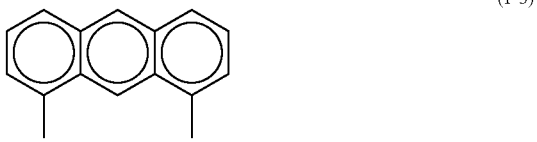

(1-3)

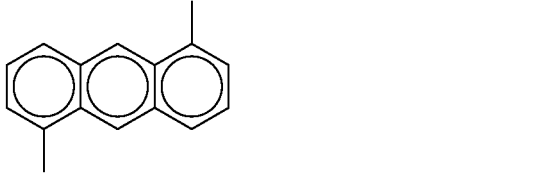

(1-4)

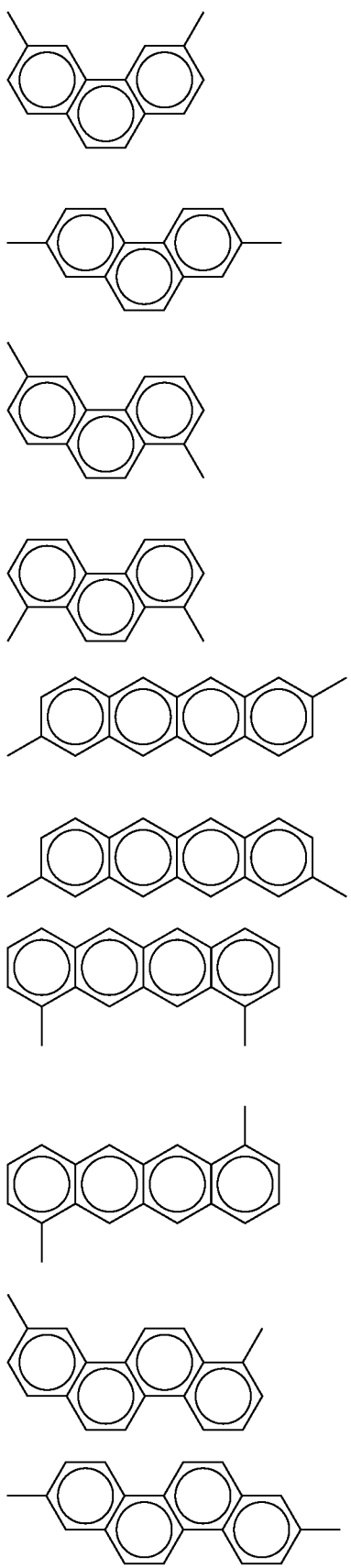

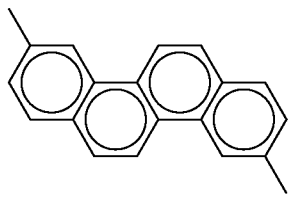

wherein a hydrogen atom in $A^1$ or A2 may be substituted with a halogen group, a methyl group, an ethyl group, or a propyl group; $Z^1$ may be singular or plural and each independently is —COO—, —OCO—, —O—, CO—, —NHCO—, —CONH—, or —S—, or a direct bond between $A^1$ and $A^2$ or between $A^2$ and $A^2$; and n is 0, 1, or 2. More preferably, the monomer is a condensed aromatic compound represented by the following formula (II):

$$P^1\text{-}A^1\text{-}P^1 \qquad (II)$$

wherein $P^1$s are each independently an acryloyloxy group, a methacryloyloxy group, an acryloylamino group, or a methacryloylamino group; and $A^1$ is either one of groups represented by the following formulae (2-1) and (2-2):

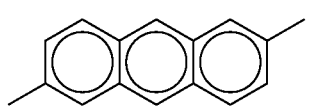

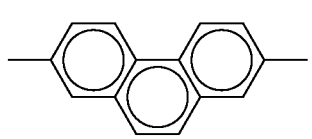

wherein a hydrogen atom in $A^1$ may be substituted with a halogen group, a methyl group, an ethyl group, or a propyl group.

The polymerizable monomers are bifunctional monomers. A more stable PSA layer can be formed when such a bifunctional monomer is mixed with liquid crystal materials than when a monofunctional monomer is mixed. Moreover, substrates that have an alignment film on the surface thereof commonly used in liquid crystal display devices tend to absorb light having a wavelength of less than 330 nm due to the influence of the main chain or side chain of the polymer included in the alignment film. Therefore, use of monomers that absorb light having a wavelength of not less than 330 nm can further enhance the light-use efficiency. Condensed aromatic compounds including not less than three benzene rings such as anthracene and phenanthrene have an absorption wavelength in a wavelength band longer than 330 nm. Therefore, use of such compounds can increase the rate of polymerization by ultraviolet ray irradiation, thereby enabling production of a stable PSA layer.

Other elements of the liquid crystal display device according to Embodiment 1 will be described in detail below.

In the liquid crystal display device according to Embodiment 1, the array substrate 1, the liquid crystal layer 3, and the color filter substrate 2 are stacked in the sequence set forth from the rear side to the observation side of the liquid crystal display device. A polarizer is mounted at the rear side of the support substrate 11 of the array substrate 1. A polarizer is also mounted at the observation side of the support substrate 21 of the color filter substrate 2. These polarizers each may be further provided with a retardation plate. These polarizers may be circular polarizers.

The liquid crystal display device according to Embodiment 1 may be any one of transmissive type, reflective type, and transmissive-and-reflective type liquid crystal display devices. In the case of transmissive type or transmissive-and-reflective type, the liquid crystal display device according to Embodiment 1 further includes a backlight. The backlight is disposed at an exterior of the rear side of the array substrate 1 so that light passes through the array substrate 1, the liquid crystal layer 3, and the color filter substrate 2 in the sequence set forth. In the case of reflective type or transmissive-and-reflective type, the array substrate 1 is provided with a reflector for reflecting external light. Moreover, in the region where at least reflected light is used for display, the polarizer of the color filter substrate 2 needs to be a circular polarizer having a λ/4 retardation plate.

The liquid crystal display device according to Embodiment 1 may have a color filter on array structure in which the array substrate 1 includes a color filter. Moreover, the liquid crystal display device according to Embodiment 1 may be a monochrome display. In this case, a color filter is not necessary.

The liquid crystal layer 3 is filled with a liquid crystal material which has a property of being aligned in a specific direction upon application of a certain voltage. The alignment of the liquid crystal molecules in the liquid crystal layer 3 is controlled by application of a threshold or higher voltage. In Embodiment 1, the liquid crystal molecules behave as in VA mode.

A component analysis of the alignment film, a component analysis of monomers (polymerizable monomers) for forming the PSA layer present in the PSA layer, the amount of the monomers (polymerizable monomers) for forming the PSA layer included in the liquid crystal layer, the ratio of the monomers (polymerizable monomers) for forming the PSA layer in the PSA layer, or the like of the liquid crystal display device according to Embodiment 1 can be determined by disassembling the liquid crystal display device (for example, liquid crystal TV (television), DID (digital information display)), and then performing a chemical analysis based on nuclear magnetic resonance (NMR), fourier transform infrared spectroscopy (FT-IR), mass Spectrometry (MS), or the like.

Example 1

The following will discuss Example 1 in which a liquid crystal cell included in the liquid crystal display device according to Embodiment 1 was actually produced. First, a pair of support substrates were prepared. A polyamic acid solution as a material of a vertical alignment film was applied to the surfaces of the pair of support substrates, followed by pre-baking at 80° C. for five minutes and subsequent post-baking at 200° C. for sixty minutes.

The imidization ratio was calculated based on the FT-IR spectrum of the alignment film after post-baking using the expression below. The imidization ratio was in a range of 30 to 40%.

Imidization ratio(%)=[As(C—N)/As(C=C)]/[Ar(C—N)/Ar(C=C)]

The A(C—N) refers to the absorbance of imide C—N stretching (to 1370 cm$^{-1}$), and the A(C=C) refers to the absorbance of aromatic C=C stretching (to 1500 cm$^{-1}$). Moreover, the As refers to the absorbance of a sample film (the alignment film in Example 1), and the Ar refers to the absorbance of a reference film. The reference film is an alignment film formed in the same manner as the sample film, except that the main baking was performed at 300° C. for 90 minutes. The imidization ratio of the reference film was assumed 100%. A degree of the imidization ratio can be controlled by the post-baking temperature.

Next, an alignment treatment was performed on the alignment film after post-baking. Next, a seal was applied to a single-sided substrate. Then a composition for forming a liquid crystal layer that contained liquid crystal materials having negative dielectric constant anisotropy and a polymerizable monomer for forming a PSA layer was dropped onto the single-sided substrate. Thereafter, the other substrate was laminated on the composition.

In Example 1, one or a combination of two of polymerizable monomers represented by the chemical formulae (3) to (5) below was/were used. The compound represented by the chemical formula (3) is a bifunctional methacrylate monomer having a biphenyl structure, the compound represented by the chemical formula (4) is a bifunctional methacrylate monomer having an anthracene structure, and the compound represented by the chemical formula (5) is a monofunctional methacrylate monomer having an anthracene structure.

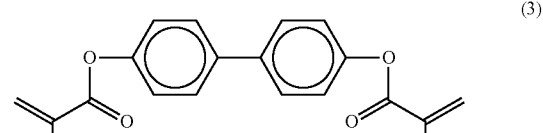

(3)

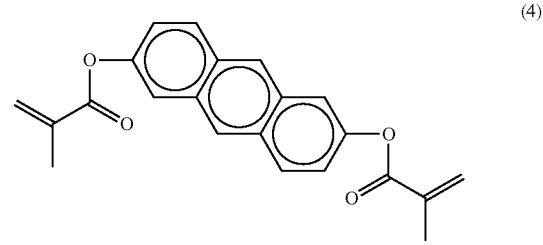

(4)

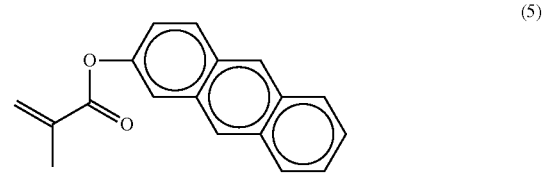

(5)

For production of the liquid crystal cell described in Example 1, compounds represented by the above chemical formulae (4) and (5) to be used as monomers for forming a PSA layer were synthesized. Meanwhile, the synthesis method of the compounds is not limited to the method below.

Synthesis Example 1

Synthesis of 2,6-dimethacryloxy anthracene (Compound of the Chemical Formula (4)

According to the synthesis method described in Non-Patent Literature 1,2,6-dihydroxy anthracene was synthesized using a commercially available 2,6-dihydroxy anthraquinone as a starting material. Using the 2,6-dihydroxy anthracene as a material, 2,6-dimethacryloxy anthracene was prepared.

First, 3 g of 2,6-dihydroxy anthracene was dissolved in 30 g of methylene chloride, and 3.6 g of methacrylic acid chloride was added to the resulting solution while the temperature thereof was adjusted to 20° C. Further, 3.4 g of trimethylamine was added dropwise at a temperature of not higher than 25° C., followed by stirring for one hour at a room temperature. To the stirred solution was dropwise added 58 g of 1% aqueous hydrochloric acid. The resulting mixed solution was separated to collect a methylene chloride layer. The collected methylene chloride was washed with 1% NaHCO$_3$, followed by washing with water, and then methylene chloride was distilled off. The residue after the distillation was recrystallized from a mixed solvent of acetone and toluene (acetone:toluene=1:4). The generated crystals were filtered and dried so that 3.2 g of a target 2,6-dimethacryloxy anthracene was obtained.

The analysis result of the obtained compound was shown below. The $^1$H-NMR revealed that the compound was 2,6-dimethacryloxy anthracene.

$^1$H-NMR(CDCl$_3$, ppm): δ=2.12 (s, 6H, methyl group), 5.80 (s, 2H, vinyl group), 6.42 (s, 2H, vinyl group), 7.27 (dd, 2H, anthracene ring), 7.74 (s, 2H, anthracene ring), 7.99 (d, 2H, anthracene ring), 8.37 (s, 2H, anthracene ring)

Synthesis Example 2

Synthesis of 2-methacryloxy anthracene (Compound of the Chemical Formula (5)

According to the synthesis method described in Non-Patent Literature 1,2-hydroxy anthracene was synthesized using a commercially available 2-hydroxy anthraquinone as a starting material. The 2-hydroxy anthracene was used as a material.

First, 3 g of 2-hydroxy anthracene was dissolved in 30 g of methylene chloride, and 1.8 g of methacrylic acid chloride was added to the resulting solution while the temperature thereof was adjusted to 20° C. Further, 1.7 g of trimethylamine was added dropwise at a temperature of not higher than 25° C., followed by stirring for one hour at a room temperature. To the stirred solution was dropwise added 29 g of 1% aqueous hydrochloric acid. The resulting mixed solution was separated to collect a methylene chloride layer. The collected methylene chloride was washed with 1% NaHCO$_3$, followed by washing with water, and then methylene chloride was distilled off. The residue after the distillation was recrystallized from a mixed solvent of acetone and toluene (acetone:toluene=1:4). The generated crystals were filtered and dried so that 2.6 g of a target 2-methacryloxy anthracene was obtained.

The analysis result of the obtained compound was shown below. The $^1$H-NMR revealed that the compound was 2-methacryloxy anthracene.

$^1$H-NMR(CDCl$_3$, ppm): δ=2.12 (s, 6H, methyl group), 5.81 (s, 1H, vinyl group), 6.43 (s, 1H, vinyl group), 7.25-7.28 (m, 1H, anthracene ring), 7.46-7.49 (m, 2H, anthracene ring), 7.55 (s, 1H, anthracene ring), 7.98-8.04 (m, 3H, anthracene ring), 8.38 (s, 1H, anthracene ring), 8.44 (s, 1H, anthracene ring)

Figure 3:
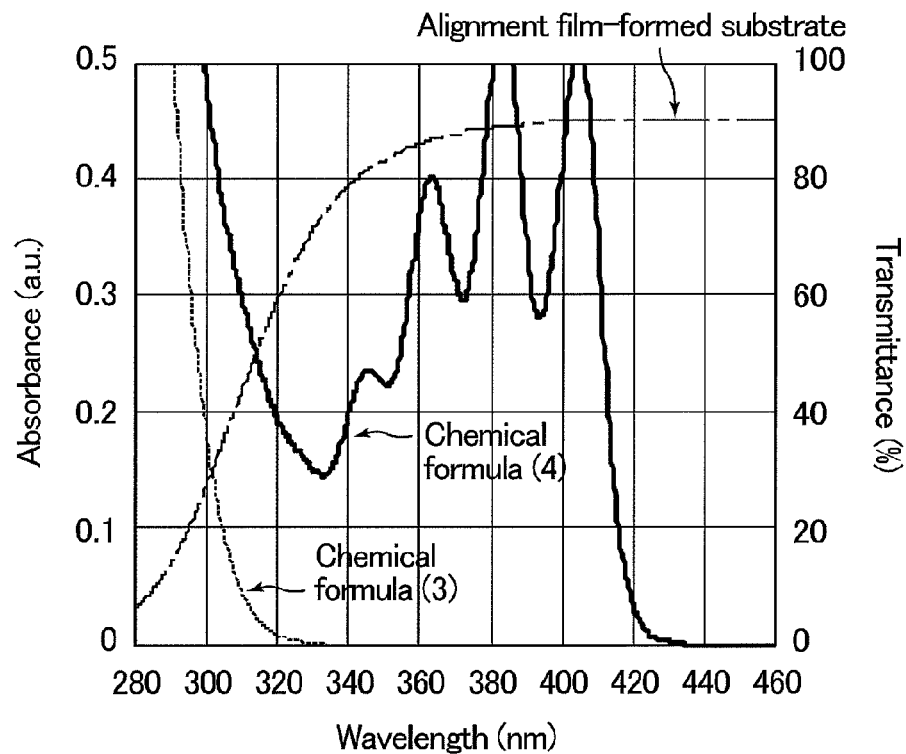
FIG. 3 is a graph showing the absorption spectra of compounds represented by the chemical formulae (3) and (4), and the transmission spectra of common alignment film-formed substrates.

FIG. 3 is a graph showing the absorption spectra of the compounds represented by the chemical formulae (3) and (4), and the transmission spectra of common alignment film-formed substrates. The compound represented by the chemical formula (3) absorbs light that has a wavelength of 320 nm at maximum or shorter. The compound represented by the chemical formula (4) absorbs light that has a wavelength of 430 nm at maximum or shorter. Therefore, the compound represented by the chemical formula (4) can absorb light in a wavelength range of 330 nm to 430 nm that is not absorbed by the compound represented by the chemical formula (3), and thus has a broader light absorption wavelength range than the compound represented by the chemical formula (3).

The alignment film-formed substrate herein refers to a substrate in which an ITO (indium tin oxide) film is formed on a glass substrate, and an alignment film is formed on the ITO film. Regarding light transmittance, common alignment film-formed substrates tend not to transmit light that has a wavelength of shorter than 340 nm.

Because of the aforementioned reasons, in the case where a PSA layer is formed by irradiating the liquid crystal layer with light through a common alignment film-formed substrate, use of only the compound represented by the chemical formula (3) takes a long time until completion of the polymerization reaction.

The following samples A to E were prepared in Example 1. In the sample A, the composition for forming liquid crystal layers contains 0.2 wt % of a bifunctional methacrylate monomer represented by the chemical formula (3) and 0.1 wt % of a bifunctional methacrylate monomer represented by the chemical formula (4). In the sample B, the composition for forming liquid crystal layers contains 0.3 wt % of a bifunctional methacrylate monomer represented by the chemical formula (3). In the sample C, the composition for forming liquid crystal layers contains 0.2 wt % of a bifunctional methacrylate monomer represented by the chemical formula (3) and 0.1 wt % of a monofunctional methacrylate monomer represented by the chemical formula (5). In the sample D, the composition for forming liquid crystal layers contains 0.1 wt % of a bifunctional methacrylate monomer represented by the chemical formula (4). The sample E contains no polymerizable monomer.

Next, the liquid crystal layer disposed between a pair of substrates was exposed to black light (ultraviolet lays having a peak wavelength in a range of 300 to 370 nm) for 80 minutes under no voltage application to initiate polymerization reaction. Thereby, a liquid crystal cell in which a PSA layer was formed on a vertical alignment film was produced in each example. The ultraviolet light source used was a FHF-32BLB produced by Toshiba Lighting and Technology Corporation. The FHF-32BLB is an ultraviolet light source that emits light having a wavelength of 310 nm with low intensity and light having a wavelength of not less than 330 nm with high intensity.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL). Table 1 shows the VHR (%) measurement results of respective samples.

TABLE 1

| | | Initial VHR (%) | VHR (%) after 1000 hrs. |
|---|---|---|---|
| Sample A | Chemical formula (3)—0.2 wt % + Chemical formula (4)—0.1 wt % | 99.4 | 99.5 |
| Sample B | Chemical formula (3)—0.3 wt % | 99.3 | 98.5 |
| Sample C | Chemical formula (3)—0.2 wt % + Chemical formula (5)—0.1 wt % | 98.8 | not more than 70% |
| Sample D | Chemical formula (4)—0.1 wt % | 99.4 | 96.5 |
| Sample E | Not added | 99.4 | 98.5 |

Use of the composition containing 0.2 wt % of the bifunctional biphenyl monomer represented by the chemical formula (3) and 0.1 wt % of the bifunctional anthracene monomer represented by the chemical formula (4) enabled to maintain the VHR at not less than 99.0% even after 1000 hours. Accordingly, long-term reliability was achieved. This is because use of the bifunctional anthracene monomer increased the polymerization rate initiated by ultraviolet ray irradiation, and a stable PSA was formed.

The composition containing 0.3 wt % of the bifunctional biphenyl monomer represented by the chemical formula (3) required ultraviolet ray irradiation for a long time (for example, not less than 10 hours). A stable PSA layer was not formed by 80 minutes irradiation, lowering the VHR to 98% level.

Use of the composition containing 0.2 wt % of the bifunctional biphenyl monomer represented by the chemical formula (3) and 0.1 wt % of the monofunctional anthracene monomer represented by the chemical formula (5) reduced the VHR to not more than 70% after 1000 hours. The result showed that use of monofunctional monomers, though they are anthracene monomers, significantly deteriorates the reliability.

In the case of using the composition containing 0.1 wt % of the bifunctional anthracene monomer represented by the chemical formula (4), a PSA layer was insufficiently formed. The VHR decreased to 96% level after 1000 hours. The result indicates that, in the case of using only a bifunctional anthracene monomer with low solubility in the liquid crystal materials, influences of deterioration of an alignment film caused by UV irradiation is so strong that the reliability deteriorates.

In the case where no monomer was added and thus no PSA layer was formed, the VHR was decreased to 98% level after 1000 hours. This is because the imidization ratio was as low as 30 to 40%.

Accordingly, it has been found that a liquid crystal display device with a high VHR for a long time can be designed when a PSA layer is formed by use of the composition containing 0.1 wt % of the bifunctional anthracene monomer represented by the chemical formula (4) and 0.2 wt % of the bifunctional biphenyl monomer represented by the chemical formula (3).

Moreover, it has also been found that addition of only a small amount (e.g. about 0.1 wt %) of the bifunctional anthracene monomer represented by the chemical formula (4) that has an absorbance at a wavelength of around 330 to 430 nm can reduce the time of the polymerization by ultraviolet irradiation, and also can reduce occurrence of image sticking in the liquid crystal display device.

Furthermore, even in the case of using a polyimide alignment film having an imidization ratio of less than 50%, since the alignment film is covered with a PSA layer, reduction of the VHR can be prevented, thereby improving long-term reliability.

The following describes the results of the residual DC voltage measurement of respective samples. Table 2 shows the results of the residual DC voltage (mV) measurement in the case of using the samples. The residual DC voltage value was determined by a flicker minimizing method after applying a DC offset voltage of 2 V for 10 hours.

TABLE 2

| | Composition weight ratio | Residual DC voltage (mV) |
|---|---|---|
| Sample A | Chemical formula (3)—0.2 wt % + Chemical formula (4)—0.1 wt % | 10 |
| Sample B | Chemical formula (3)—0.3 wt % | 160 |
| Sample C | Chemical formula (3)—0.2 wt % + Chemical formula (5)—0.1 wt % | 260 |
| Sample D | Chemical formula (4)—0.1 wt % | 20 |
| Sample E | Not added | 210 |

Use of the composition containing 0.2 wt % of the bifunctional biphenyl monomer represented by the chemical formula (3) and 0.1 wt % of the bifunctional anthracene monomer represented by the chemical formula (4) reduced the residual DC voltage to as small as 10 mV. Accordingly, an effect of reducing occurrence of image sticking was achieved. This is because use of the bifunctional anthracene monomer increased the polymerization rate initiated by ultraviolet ray irradiation, and a stable PSA was formed.

The composition containing 0.3 wt % of the bifunctional biphenyl monomer represented by the chemical formula (3) required ultraviolet ray irradiation for a long time (for example, not less than 10 hours). A stable PSA layer was not formed by 80 minutes irradiation, resulting in the residual DC voltage of 160 mV.

Use of the composition containing 0.2 wt % of the bifunctional biphenyl monomer represented by the chemical formula (3) and 0.1 wt % of the monofunctional anthracene monomer represented by the chemical formula (5) deteriorated the residual DC voltage to 260 mV. The results showed that use of monofunctional monomers, though they are anthracene monomers, significantly increases occurrence of image sticking.

In the case of using the composition containing 0.1 wt % of the bifunctional anthracene monomer represented by the chemical formula (4), a PSA layer was insufficiently formed. The residual DC voltage was reduced only to 20 mV, which was higher than the residual DC voltage in the case where the composition containing 0.2 wt % of the bifunctional biphenyl monomer represented by the chemical formula (3) was further mixed. The result indicates that an alignment film has a great influence in the case of using only a bifunctional anthracene monomer with low solubility, and the effect of reducing occurrence of image sticking is small.

In the case where no monomer was added and thus no PSA layer was formed, the residual DC voltage was as high as 210 mV. This is supposedly due to reduction in the VHR caused by the 1000 hour-standing on the backlight, i.e., increase in the density of ionic impurities, and easy accumulation of electric charges in an interface of the liquid crystal layer and polyimide side chains of the alignment film.

Accordingly, it has been found that a liquid crystal display device with a small residual DC voltage can be designed when a PSA layer is formed by use of the composition containing 0.1 wt % of the bifunctional anthracene monomer represented by the chemical formula (4) and 0.2 wt % of the bifunctional biphenyl monomer represented by the chemical formula (3).

Furthermore, even in the case of using a polyimide alignment film having an imidization ratio of less than 50%, since the alignment film is covered with a PSA layer, the residual DC voltage is reduced, thereby improving long-term reliability.

Example 2

The following will discuss Example 2 in which a liquid crystal cell included in the liquid crystal display device according Embodiment 1 was actually produced. Samples of liquid crystal cells used in Example 2 were produced in the same manner as in Example 1, except that no alignment treatment was performed on the alignment film, and a PSA layer was formed by light irradiation while a threshold or higher voltage was applied.

The following samples F to J were prepared in Example 2. In sample F, the composition for forming liquid crystal layers includes 0.2 wt % of a bifunctional methacrylate monomer represented by the chemical formula (3) and 0.1 wt % of a bifunctional methacrylate monomer represented by the chemical formula (4). In sample G, the composition for forming liquid crystal layers includes 0.3 wt % of a bifunctional methacrylate monomer represented by the chemical formula (3). In sample H, the composition for forming liquid crystal layers includes 0.2 wt % of the bifunctional methacrylate monomer represented by the chemical formula (3) and 0.1 wt % of the monofunctional methacrylate monomer represented by the chemical formula (5). In sample I, the composition for forming liquid crystal layers includes 0.1 wt % of the bifunctional methacrylate monomer represented by the chemical formula (4). Sample J includes no polymerizable monomer.

Next, the liquid crystal layer disposed between a pair of substrates was exposed to black light (ultraviolet lays having a peak wavelength in a range of 300 to 370 nm) for 80 minutes under application of a threshold or higher voltage (10 V rectangular wave voltage) to initiate polymerization reaction. Thereby, a liquid crystal cell in which a PSA layer was formed on a vertical alignment film was produced in each example. The ultraviolet light source used was a FHF-32BLB produced by Toshiba Lighting and Technology Corporation.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a CCFL. Table 3 shows the VHR (%) measurement results of respective samples.

TABLE 3

|  |  | Initial VHR (%) | VHR (%) after 1000 hrs. |
|---|---|---|---|
| Sample F | Chemical formula (3)—0.2 wt % + Chemical formula (4)—0.1 wt % | 99.4 | 99.5 |
| Sample G | Chemical formula (3)—0.3 wt % | 99.3 | 98.6 |
| Sample H | Chemical formula (3)—0.2 wt % + Chemical formula (5)—0.1 wt % | 99.0 | not more than 70% |
| Sample I | Chemical formula (4)—0.1 wt % | 99.5 | 95.0 |
| Sample J | Not added | 99.5 | 98.5 |

Use of the composition containing 0.2 wt % of the bifunctional biphenyl monomer represented by the chemical formula (3) and 0.1 wt % of the bifunctional anthracene monomer represented by the chemical formula (4) enabled to maintain the VHR at not less than 99.0% even after 1000 hours. Accordingly, long-term reliability was achieved. This is because use of the bifunctional anthracene monomer increased the polymerization rate initiated by ultraviolet ray irradiation, and a stable PSA was formed.

The composition containing 0.3 wt % of the bifunctional biphenyl monomer represented by the chemical formula (3) required ultraviolet ray irradiation for a long time (for example, not less than 10 hours). A stable PSA layer was not formed by 80 minutes irradiation, lowering the VHR to 98% level.

Use of the composition containing 0.2 wt % of the bifunctional biphenyl monomer represented by the chemical formula (3) and 0.1 wt % of the monofunctional anthracene monomer represented by the chemical formula (5) reduced the VHR to not more than 70% after 1000 hours. The result showed that use of monofunctional monomers, though they are anthracene monomers, significantly deteriorates the reliability.

In the case of using the composition containing 0.1 wt % of the bifunctional anthracene monomer represented by the chemical formula (4), a PSA layer was insufficiently formed. The VHR decreased to 95% level after 1000 hours. The result indicates that, in the case of using only a bifunctional anthracene monomer with low solubility in the liquid crystal materials, influences of deterioration of an alignment film caused by UV irradiation is so strong that the reliability deteriorates.

In the case where no monomer was added and thus no PSA layer was formed, the VHR was decreased to 98% level after 1000 hours. This is because the imidization ratio was as low as 30 to 40%.

Accordingly, it has been found that a liquid crystal display device with a high VHR for a long time can be designed when a PSA layer is formed by use of the composition containing 0.1 wt % of the bifunctional anthracene monomer represented by the chemical formula (4) and 0.2 wt % of the bifunctional biphenyl monomer represented by the chemical formula (3).

Moreover, it has also been found that addition of only a small amount (e.g. about 0.1 wt %) of the bifunctional anthracene monomer represented by the chemical formula (4) that has an absorbance at a wavelength of around 330 to 430 nm can reduce the time of the polymerization by ultraviolet irradiation, and also can reduce occurrence of image sticking in the liquid crystal display device.

Furthermore, even in the case of using a polyimide alignment film having an imidization ratio of less than 50%, since the alignment film is covered with a PSA layer, reduction of the VHR can be prevented, thereby improving long-term reliability.

Thereafter, each of the produced liquid crystal cells was measured for the residual DC voltage (mV). The following describes the results of the residual DC voltage measurement of respective samples. Table 4 shows the results of the residual DC voltage (mV) measurement in the case of using the samples. In Example 2, the residual DC voltage value was determined by a flicker minimizing method after applying a DC offset voltage of 2 V for 10 hours.

TABLE 4

|  |  | Residual DC voltage (mV) |
|---|---|---|
| Sample F | Chemical formula (3)—0.2 wt % + Chemical formula (4)—0.1 wt % | 0 |
| Sample G | Chemical formula (3)—0.3 wt % | 120 |
| Sample H | Chemical formula (3)—0.2 wt % + Chemical formula (5)—0.1 wt % | 250 |
| Sample I | Chemical formula (4)—0.1 wt % | 10 |
| Sample J | Not added | 180 |

Use of the composition containing 0.2 wt % of the bifunctional biphenyl monomer represented by the chemical formula (3) and 0.1 wt % of the bifunctional anthracene monomer represented by the chemical formula (4) reduced the residual DC voltage to 0 mV. Accordingly, an effect of reducing occurrence of image sticking was achieved. This is because use of the bifunctional anthracene monomer increased the polymerization rate initiated by ultraviolet ray irradiation, and a stable PSA was formed.

The composition containing 0.3 wt % of the bifunctional biphenyl monomer represented by the chemical formula (3) required ultraviolet ray irradiation for a long time (for example, not less than 10 hours). A stable PSA layer was not formed by 80 minutes irradiation, resulting in the residual DC voltage of 120 mV.

Use of the composition containing 0.2 wt % of the bifunctional biphenyl monomer represented by the chemical formula (3) and 0.1 wt % of the monofunctional anthracene monomer represented by the chemical formula (5) deteriorated the residual DC voltage to 250 mV. The results showed that use of monofunctional monomers, though they are anthracene monomers, significantly increases occurrence of image sticking.

In the case of using the composition containing 0.1 wt % of the bifunctional anthracene monomer represented by the chemical formula (4), a PSA layer was insufficiently formed. The residual DC voltage was reduced only to 10 mV, which was higher than the residual DC voltage in the case where the composition containing 0.2 wt % of the bifunctional biphenyl monomer represented by the chemical formula (3) was further mixed. The result indicates that an alignment film has a great influence in the case of using only a bifunctional anthracene monomer with low solubility, and the effect of reducing occurrence of image sticking is small.

In the case where no monomer was added and thus no PSA layer was formed, the residual DC voltage was as high as 180 mV. This is supposedly due to reduction in the VHR caused by the 1000 hour-standing on the backlight, i.e., increase in the density of ionic impurities, and easy accumulation of electric charges in an interface of the liquid crystal layer and polyimide side chains of the alignment film.

Accordingly, it has been found that a liquid crystal display device with a small residual DC voltage can be designed when a PSA layer is formed by use of the composition containing 0.1 wt % of the bifunctional anthracene monomer represented by the chemical formula (4) and 0.2 wt % of the bifunctional biphenyl monomer represented by the chemical formula (3).

Furthermore, even in the case of using a polyimide alignment film having an imidization ratio of less than 50%, since the alignment film is covered with a PSA layer, the residual DC voltage is reduced, thereby improving long-term reliability.

Example 3

The following will discuss Example 3 in which a liquid crystal cell included in the liquid crystal display device according Embodiment 1 was actually produced. Samples of liquid crystal cells used in Example 3 were produced in the same manner as in Example 1, except that the polymerizable monomers in the compositions for forming liquid crystal layers had different components and different weight ratios.

In Example 3, one or a combination of two of the polymerizable monomers represented by the chemical formulae (3) and (6) was/were used. The compound represented by the chemical formula (6) below is a bifunctional methacrylate monomer having a phenanthrene structure.

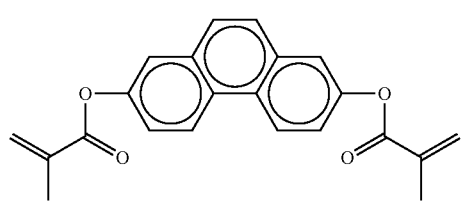

(6)

For production of the liquid crystal cell described in Example 3, a compound represented by the chemical formula (6) to be used as a monomer for forming a PSA layer was synthesized. The compound was synthesized unlimitedly according to the method below.

Synthesis Example 3

Synthesis of 2,7-dimethacryloxy phenanthrene (Compound of the Chemical Formula (6)

According to the synthesis method described in Patent Document 5 mentioned above, 2,7-dimethacryloxy phenanthrene was prepared using a commercially available phenanthrene as a starting material.

The analysis result of the obtained compound was shown below. The $^1$H-NMR revealed that the compound was 2,7-dimethacryloxy phenanthrene.

$^1$H-NMR(CDCl$_3$, ppm): δ=2.12 (s, 6H, methyl), 5.81 (s, 2H, vinyl), 6.43 (s, 2H, vinyl), 7.44 (d, 2H, phenanthrene ring), 7.66 (s, 2H, phenanthrene ring), 7.71 (s, 2H, phenanthrene ring), 8.66 (d, 2H, phenanthrene ring)

Figure 4:
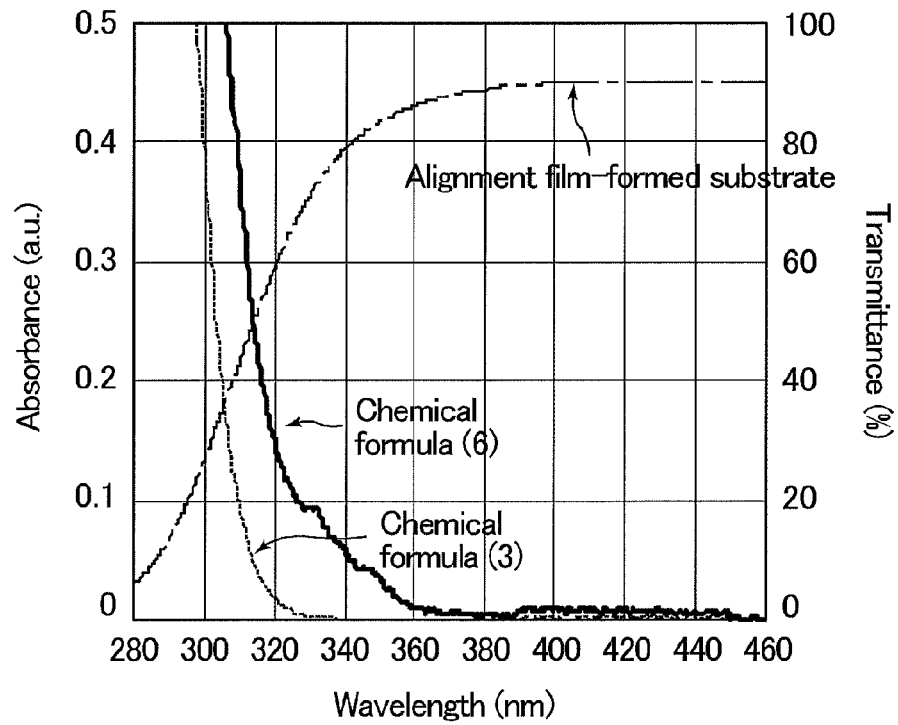
FIG. 4 is a graph showing the absorption spectra of compounds represented by the chemical formulae (3) and (6), and the transmission spectra of common alignment film-formed substrates.
Figure 5:
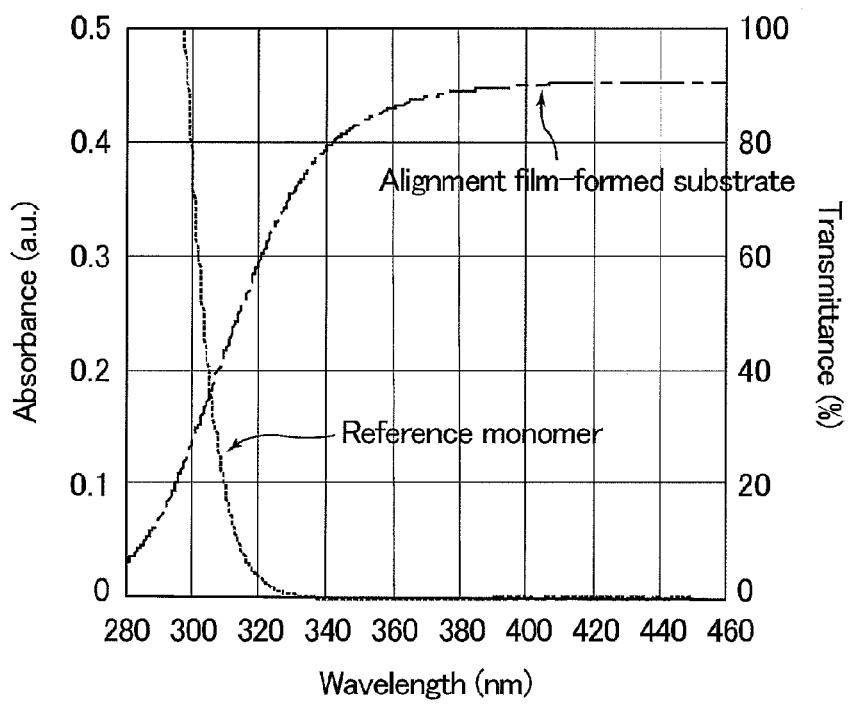
FIG. 5 is a graph showing a relationship between the absorbance (a.u.) of a reference monomer and the transmittance (%) of an alignment film-formed substrate.
Figure 6:
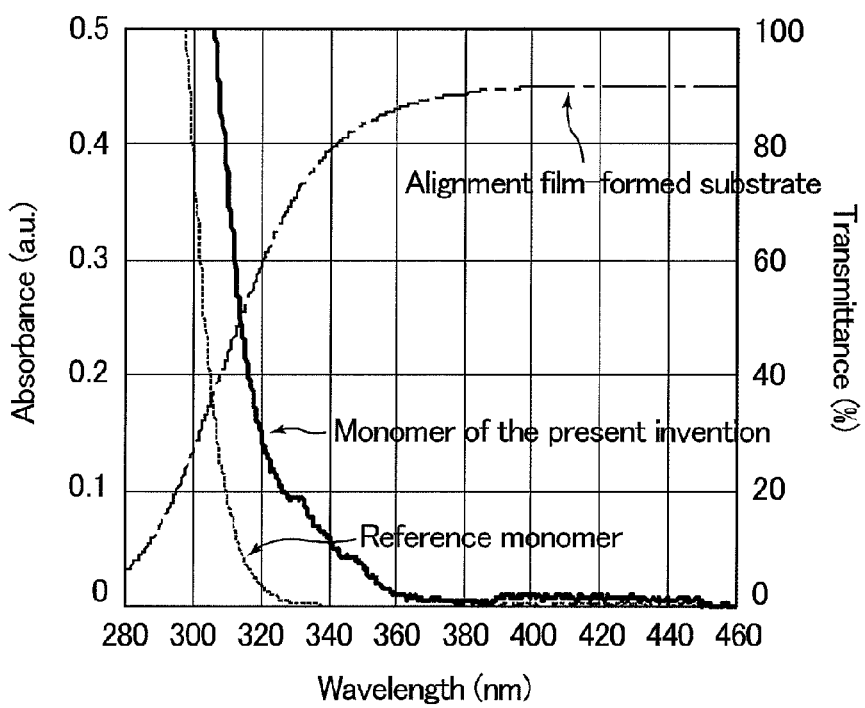
FIG. 6 is a graph showing a relationship between the absorbance (a.u.) of one example of the monomer of the present invention and the transmittance (%) of an alignment film-formed substrate.

FIG. 4 is a graph showing the absorption spectra of compounds represented by the chemical formulae (3) and (6), and the transmission spectra of common alignment film-formed substrates. The compound represented by the chemical formula (3) absorbs light that has a wavelength of 320 nm at maximum or shorter. The compound represented by the chemical formula (6) practically absorbs light that has a wavelength of 360 nm at maximum or shorter. Therefore, the compound represented by the chemical formula (6) can absorb light in a wavelength range of 330 nm to 360 nm that is not absorbed by the compound represented by the chemical formula (3), and thus has a broader light absorption wavelength range than the compound represented by the chemical formula (3).

The following samples K and L were prepared in Example 3. The sample K includes 0.6 wt % of a bifunctional methacrylate monomer represented by the chemical formula (6). The sample L includes 0.3 wt % of a bifunctional methacrylate monomer represented by the chemical formula (6) and 0.3 wt % of a bifunctional methacrylate monomer represented by the chemical formula (3).

Next, the liquid crystal layer disposed between a pair of substrates was exposed to black light (ultraviolet lays having a peak wavelength in a range of 300 to 370 nm) for 80 minutes under application of no voltage to initiate polymerization reaction. Thereby, a liquid crystal cell in which a PSA layer was formed on a vertical alignment film was produced in each example. The ultraviolet light source used was a FHF-32BLB produced by Toshiba Lighting and Technology Corporation.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a CCFL. Table 5 shows the VHR (%) measurement results of respective samples.

TABLE 5

| | | Initial VHR (%) | VHR (%) after 1000 hrs. |
|---|---|---|---|
| Sample K | Chemical formula (6)—0.6 wt % | 99.1 | 99.5 |
| Sample L | Chemical formula (6)—0.3 wt % + Chemical formula (3)—0.3 wt % | 99.4 | 99.5 |

When a PSA layer was formed using the bifunctional phenanthrene monomer represented by the chemical formula (6), the VHR was maintained at not less than 99.0% even after 1000 hours. Accordingly, long-term reliability was achieved.

Moreover, when the bifunctional biphenyl monomer represented by the chemical formula (3) was further mixed, the VHR was maintained at not less than 99.0% after 1000 hours. Accordingly, long-term reliability was achieved. The results indicate that use of the bifunctional monomer represented by the chemical formula (6) enables formation of a PSA layer by ultraviolet ray irradiation for a shorter time than usual, and is therefore effective to improve the long-term reliability.

The following describes the results of the residual DC voltage measurement of respective samples. Table 6 shows the results of the residual DC voltage (mV) measurement in the case of using the samples. In Example 3, the residual DC voltage value was determined by a flicker minimizing method after applying a DC offset voltage of 2 V for 10 hours.

TABLE 6

| | | Residual DC voltage (mV) |
|---|---|---|
| Sample K | Chemical formula (6)—0.6 wt % | 0 |
| Sample L | Chemical formula (6)—0.3 wt % + Chemical formula (3)—0.3 wt % | 0 |

In the case where a PSA layer was formed by using the bifunctional phenanthrene monomer represented by the chemical formula (6), the residual DC voltage was 0 mV, thereby achieving an excellent effect of reducing occurrence of image sticking.

In also the case where the bifunctional biphenyl monomer represented by the chemical formula (3) was mixed, the residual DC voltage was 0 mV, thereby achieving an excellent effect of reducing occurrence of image sticking.

It has been found that use of the bifunctional phenanthrene monomer represented by the chemical formula (6) enables formation of a PSA layer by ultraviolet ray irradiation for a shorter time than usual. Therefore, degradation of parts can be prevented, and the effect of reducing occurrence of image sticking can be achieved.

Example 4

The following will discuss Example 4 in which a liquid crystal cell included in the liquid crystal display device according Embodiment 1 was actually produced. Samples of liquid crystal cells used in Example 4 were produced in the same manner as in Example 2, except that the polymerizable monomers in the compositions for forming liquid crystal layers had different components and different weight ratios.

The following samples M and N were prepared in Example 4. The sample M includes 0.6 wt % of a bifunctional methacrylate monomer represented by the chemical formula (6). The sample N includes 0.3 wt % of a bifunctional methacrylate monomer represented by the chemical formula (6) and 0.3 wt % of a bifunctional methacrylate monomer represented by the chemical formula (3).

Next, the liquid crystal layer disposed between a pair of substrates was exposed to black light (ultraviolet lays having a peak wavelength in a range of 300 to 370 nm) for 80 minutes under application of a threshold or higher voltage to initiate polymerization reaction. Thereby, a liquid crystal cell in which a PSA layer was formed on a vertical alignment film was produced in each example. The ultraviolet light source used was a FHF-32BLB produced by Toshiba Lighting and Technology Corporation.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a CCFL. Table 7 shows the VHR (%) measurement results of respective samples.

TABLE 7

| | | Initial VHR (%) | VHR (%) after 1000 hrs. |
|---|---|---|---|
| Sample M | Chemical formula (6)—0.6 wt % | 99.1 | 99.5 |
| Sample N | Chemical formula (6)—0.3 wt % + Chemical formula (3)—0.3 wt % | 99.2 | 99.5 |

When a PSA layer was formed using the bifunctional phenanthrene monomer represented by the chemical formula (6), the VHR was maintained at not less than 99.0% even after 1000 hours. Accordingly, long-term reliability was achieved.

Moreover, when the bifunctional biphenyl monomer represented by the chemical formula (3) was further mixed, the VHR was maintained at not less than 99.0% after 1000 hours. Accordingly, long-term reliability was achieved. The results indicate that use of the bifunctional monomer represented by the chemical formula (6) enables formation of a PSA layer by ultraviolet ray irradiation for a shorter time than usual, and is therefore effective to improve the long-term reliability.

The following describes the results of the residual DC voltage measurement of respective samples. Table 8 shows the results of the residual DC voltage (mV) measurement in the case of using the samples. In Example 4, the residual DC voltage value was determined by a flicker minimizing method after applying a DC offset voltage of 2 V for 10 hours.

TABLE 8

| | | Residual DC voltage (mV) |
|---|---|---|
| Sample M | Chemical formula (6)—0.6 wt % | 0 |
| Sample N | Chemical formula (6)—0.3 wt % + Chemical formula (3)—0.3 wt % | 0 |

In the case that a PSA layer was formed by using the bifunctional phenanthrene monomer represented by the chemical formula (6), the residual DC voltage was 0 mV, thereby achieving an excellent effect of reducing occurrence of image sticking.

In also the case that the bifunctional biphenyl monomer represented by the chemical formula (3) was mixed, the residual DC voltage was 0 mV, thereby achieving an excellent effect of reducing occurrence of image sticking.

It has been found that use of the bifunctional phenanthrene monomer represented by the chemical formula (6) enables formation of a PSA layer by ultraviolet ray irradiation for a shorter time than usual. Therefore, degradation of parts can be prevented, and the effect of reducing occurrence of image sticking can be achieved.

The present application claims priority to Patent Application No. 2010-174501 filed in Japan on Aug. 3, 2010 under the Paris Convention and provisions of national law in a designated State, the entire contents of which are hereby incorporated by reference.

REFERENCE SIGNS LIST

1: Array substrate
2: Color filter substrate
3: Liquid crystal layer
4: Polymerizable monomer
11, 21: Support substrate
12, 22: Alignment film
13, 23: PSA layer (polymer layer)

The invention claimed is:

1. A liquid crystal display device comprising
a pair of substrates, and
a liquid crystal layer disposed between the pair of substrates,
wherein the liquid crystal layer includes a liquid crystal material having a negative dielectric constant anisotropy,
at least one of the pair of substrates is provided with an alignment film for vertically aligning adjacent liquid crystal molecules, and a polymer layer formed on the alignment film for controlling the alignment of the adjacent liquid crystal molecules,
the polymer layer is formed by polymerization of at least one monomer, the polymerization being initiated by radicals generated of the monomer upon absorption of light,
the alignment film includes a polymer compound having a main chain that contains an imide structure, and
the main chain has an imidization ratio of less than 50%,
the at least one monomer being a condensed aromatic compound represented by the following formula (II):

P¹-A¹-P¹     (II)

wherein P¹s are each independently an acryloyloxy group, a methacryloyloxy group, an acryloylamino group, or a methacryloylamino group; and
A¹ is represented by the following formula (2-2):

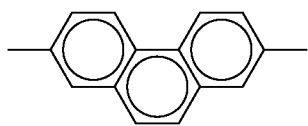
(2-2)

wherein a hydrogen atom in A¹ may be substituted with a halogen group, a methyl group, an ethyl group, or a propyl group.

2. The liquid crystal display device according to claim 1, wherein the at least one monomer generates radicals upon exposure to light that has a wavelength of not less than 330 nm.

3. The liquid crystal display device according to claim 1, wherein a voltage holding ratio of the liquid crystal layer after a lapse of 16.61 ms from application of a pulse voltage of 1 V is not less than 99.0%, and also a residual DC voltage of the liquid crystal layer after application of a DC offset voltage of 2 V for 10 hours is not more than 50 mV; after the liquid crystal layer has been allowed to stand on a backlight for 1000 hours.

4. A method for producing a liquid crystal display device comprising a pair of substrates, and a liquid crystal layer disposed between the pair of substrates, the method comprising:
forming an alignment film for vertically aligning adjacent liquid-crystal molecules on at least one of the pair of substrates,
forming a polymer layer for controlling the alignment of the adjacent liquid crystal molecules on the alignment film,
and forming the liquid crystal layer on the polymer layer,
wherein the polymer layer formation includes initiating polymerization of at least one monomer that generates radicals upon absorption of light by exposing the monomer to light,
the alignment film includes a polymer compound having a main chain that contains an imide structure, and
the main chain has an imidization ratio of less than 50%,
the at least one monomer being a condensed aromatic compound represented by the following formula (II):

P¹-A¹-P¹     (II)

wherein the P¹s are each independently an acryloyloxy group, a methacryloyloxy group, an acryloylamino group, or a methacryloylamino group; and
A¹ is represented by the following formula (2-2):

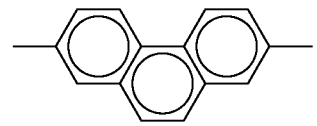

wherein a hydrogen atom in A¹ may be substituted with a halogen group, a methyl group, an ethyl group, or a propyl group.

5. The method for producing a liquid crystal display device according to claim 4,
wherein the polymer layer formation includes initiating polymerization by light irradiation to the liquid crystal layer to which a threshold or higher voltage is applied.

6. The method for producing a liquid crystal display device according to claim 4,
wherein the polymer layer formation includes initiating polymerization by light irradiation to the liquid crystal layer to which a threshold or higher voltage is not applied.

7. The method for producing a liquid crystal display device according to claim 4,
wherein the at least one monomer generates radicals upon exposure to light that has a wavelength of not less than 330 nm.

* * * * *